(12) United States Patent
Teraoka (10) Patent No.: US 10,558,018 B2
(45) Date of Patent: Feb. 11, 2020

(54) CAMERA LENS

(71) Applicant: AAC Acoustic Technologies (Shenzhen) Co. Ltd., Shenzhen (CN)

(72) Inventor: Hiroyuki Teraoka, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/006,865

(22) Filed: Jun. 13, 2018

(65) Prior Publication Data

US 2019/0293908 A1 Sep. 26, 2019

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
USPC ......................................................... 359/713
See application file for complete search history.

(56) References Cited

U.S. PATENT DOCUMENTS

| | | | | |
|---|---|---|---|---|
| 2016/0011405 A1* | 1/2016 | Shinohara | ................ | G02B 9/62 359/713 |
| 2016/0124191 A1* | 5/2016 | Hashimoto | ............ | G02B 13/18 359/708 |
| 2017/0059828 A1* | 3/2017 | Sekine | ............... | G02B 13/0045 |
| 2019/0170975 A1* | 6/2019 | Teraoka | ............ | G02B 13/0045 |

* cited by examiner

*Primary Examiner* — Collin X Beatty
*Assistant Examiner* — Grant A Gagnon
(74) *Attorney, Agent, or Firm* — IPro, PLLC; Na Xu (57) ABSTRACT

The present disclosure discloses a camera lens. The camera lens including, in an order from an object side to an image side, a first lens having a positive refractive power, a second lens having a negative refractive power, a third lens having a positive refractive power, a fourth lens having a negative refractive power, a fifth lens having a positive refractive power, and a sixth lens having a negative refractive power. The camera lens further satisfies specific conditions.

2 Claims, 7 Drawing Sheets

CAMERA LENS

CROSS-REFERENCE TO RELATED APPLICATIONS

This application claims the priority benefit of Japanese Patent Application Ser. No. 2018-055066 filed on Mar. 22, 2018, the entire content of which is incorporated herein by reference.

FIELD OF THE PRESENT DISCLOSURE

The present disclosure relates to optical lens, in particular to a camera lens suitable for handheld devices such as smart phones and digital cameras and imaging devices.

DESCRIPTION OF RELATED ART

With the emergence of smart phones in recent years, the demand for miniature camera lens is increasing day by day, but the photosensitive devices of general camera lens are no other than Charge Coupled Device (CCD) or Complementary metal-Oxide Semiconductor Sensor (CMOS sensor), and as the progress of the semiconductor manufacturing technology makes the pixel size of the photosensitive devices shrink, coupled with the current development trend of electronic products being that their functions should be better and their shape should be thin and small, miniature camera lens with good imaging quality therefor has become a mainstream in the market.

Traditional camera lens includes 6 lenses, from the object side to the image side, comprising in sequence: a first lens, a second lens, a third lens, a fourth lens, a fifth lens, and a sixth lens. But the refractive index distribution of the third lens and the shape of the third lens and the fifth lens are insufficient, so that, in order to realize Fno=1.82~1.83, although the light flux is high, but the ultra-thin is insufficiency. Other traditional camera lenses also includes 6 lenses, but the refractive index distribution of the third lens and the shape of the third lens and the fifth lens are insufficient, so that, in order to realize Fno≥2.15, the luminance is insufficient.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 1:
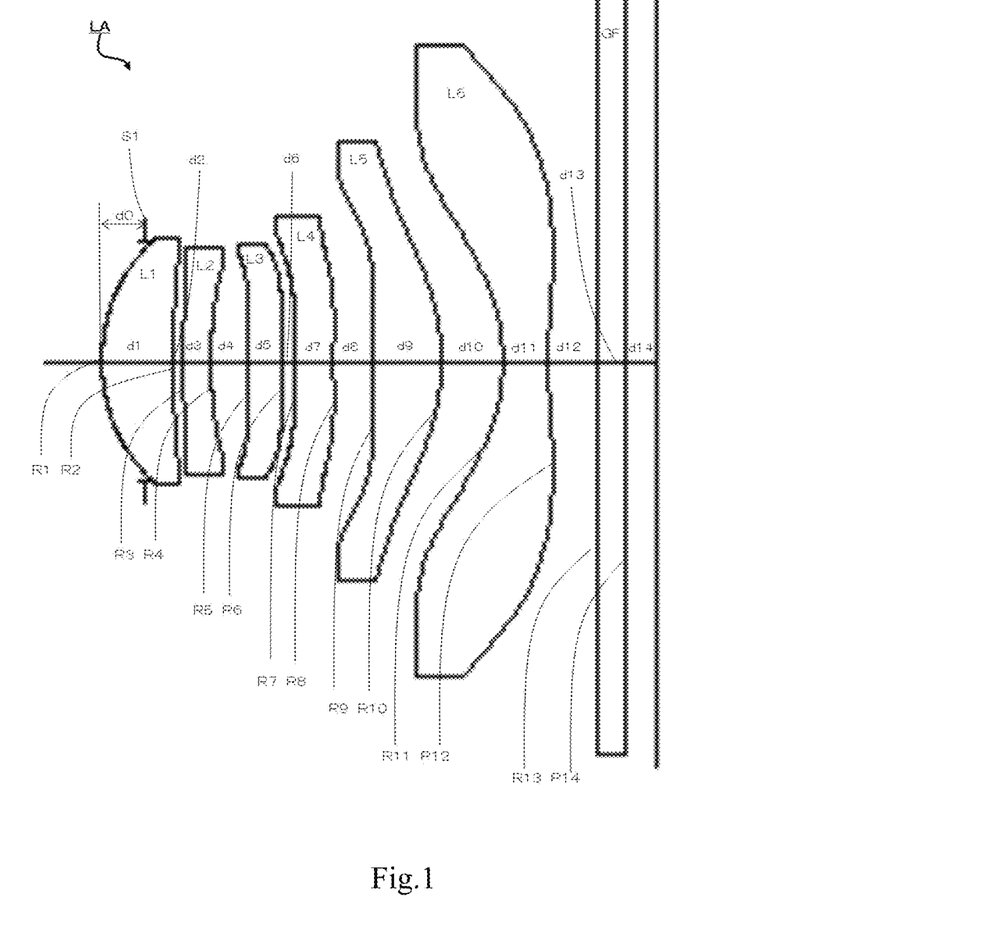
FIG. 1 is a schematic diagram of a camera lens LA in accordance with an embodiment of the present invention.

As referring to FIG. 1, the present invention provides a camera lens LA. FIG. 1 shows a schematic diagram of a camera lens LA in accordance with an embodiment of the present invention. The camera lens LA comprises 6 lenses. Specifically, from the object side to the image side, the camera lens LA comprises in sequence: a first lens L1, a second lens L2, a third lens L3, a fourth lens L4, a fifth lens L5, and a sixth lens L6. A glass plate GF may be arranged between the sixth lens L6 and the image surface Si or not be arranged between the sixth lens L6 and the image surface Si. The glass plate GF is a cover-glass or a filter with IR cut-off function.

The first lens L1 has a positive refractive power, the second lens L2 has a negative refractive power, the third lens L3 has a positive refractive power, the fourth lens L4 has a negative refractive power, the fifth lens L5 has a positive refractive power, and the sixth lens L6 has a negative refractive power. In order to correct aberration problem, the surface of the six lens L6 should be designed to aspherical surface.

The camera lens LA satisfies the following conditions (1)~(3):

$$10.00 \leq f3/f \leq 15.00 \quad (1)$$

$$-4.80 \leq (R5+R6)/(R5-R6) \leq -4.20 \quad (2)$$

$$0.50 \leq (R9+R10)/(R9-R10) \leq 0.70 \quad (3)$$

where f: the focal length of the camera lens;
f3: the focal length of the third lens;
R5: the curvature radius of the object side surface of the third lens;
R6: the curvature radius of the image side surface of the third lens;
R9: the curvature radius of the object side surface of the fifth lens;
R10: the curvature radius of the image side surface of the fifth lens.

Condition (1) fixes the positive refractive power of the third lens L3. When the value of the upper condition (1) is exceeded, and it is also unfavorable for high light flux, excellent optical characteristics, and ultra-thin development of lens.

Condition (2) fixes the shape of the third lens L3. When the value of the upper condition (2) is exceeded, and it is also unfavorable for high light flux, excellent optical characteristics, and miniaturization development of lens.

Condition (3) fixes the shape of the fifth lens L5. When the value of the upper condition (3) is exceeded, and it is also unfavorable for high light flux, excellent optical characteristics, and miniaturization development of lens.

The camera lens LA further satisfies the following condition (4):

$$0.12 \leq d10/f \leq 0.14 \quad (4)$$

where f: the focal length of the camera lens;

d10: the distance on-axis from the image side surface of the fifth lens to the object side surface of the sixth lens.

Condition (4) fixes the distance on-axis from the image side surface of the fifth lens to the object side surface of the sixth lens. When the value of the upper condition (4) is exceeded, and it is also unfavorable for high light flux, excellent optical characteristics, and miniaturization development of lens.

Because the 6 lens of the camera lens LA satisfy the foresaid conditions, the camera lens LA can be manufactured with excellent optical characteristics, ultra-thin and high light flux (Fno).

The design information of the camera lens LA in an embodiment of the present invention is shown in the following, the unit of the focal length, distance, radius and center thickness is mm.

In which, the meaning of the various symbols is as follows.

f: The focal length of the camera lens;
f1: The focal length of the first lens;
f2: The focal length of the second lens;
f3: The focal length of the third lens;
f4: The focal length of the fourth lens;
f5: The focal length of the fifth lens;
f6: The focal length of the sixth lens;
Fno: F value;
2ω: Field;
S1: Aperture;
R: The curvature radius of the optical surface, the central curvature radius in case of lens;
R1: The curvature radius of the object side surface of the first lens L1;
R2: The curvature radius of the image side surface of the first lens L1;
R3: The curvature radius of the object side surface of the second lens L2;
R4: The curvature radius of the image side surface of the second lens L2;
R5: The curvature radius of the object side surface of the third lens L3;
R6: The curvature radius of the image side surface of the third lens L3;
R7: The curvature radius of the object side surface of the fourth lens L4;
R8: The curvature radius of the image side surface of the fourth lens L4;
R9: The curvature radius of the object side surface of the fifth lens L5;
R10: The curvature radius of the image side surface of the fifth lens L5;
R11: The curvature radius of the object side surface of the sixth lens L6;
R12: The curvature radius of the image side surface of the sixth lens L6;
R13: The curvature radius of the object side surface of the glass plate GF;
R14: The curvature radius of the image side surface of the glass plate GF;
d: The thickness on-axis of the lens and the distance on-axis between the lens;
d0: The distance on-axis from aperture S1 to the object side surface of the first lens L1;
d1: The thickness on-axis of the first lens L1;
d2: The distance on-axis from the image side surface of the first lens L1 to the object side surface of the second lens L2;
d3: The thickness on-axis of the second lens L2;
d4: The distance on-axis from the image side surface of the second lens L2 to the object side surface of the third lens L3;
d5: The thickness on-axis of the third lens L3;
d6: The distance on-axis from the image side surface of the third lens L3 to the object side surface of the fourth lens L4;
d7: The thickness on-axis of the fourth lens L4;
d8: The distance on-axis from the image side surface of the fourth lens L4 to the object side surface of the fifth lens L5;
d9: The thickness on-axis of the fifth lens L5;
d10: The distance on-axis from the image side surface of the fifth lens L5 to the object side surface of the sixth lens L6;
d11: The thickness on-axis of the sixth lens L6;
d12: The distance on-axis from the image side surface of the sixth lens L6 to the object side surface of the optical filter GF;
d13: The thickness on-axis of the optical filter GF;
d14: The distance on-axis from the image side surface to the image surface of the optical filter GF;
nd: The refractive power of the d line;
nd1: The refractive power of the d line of the first lens L1;
nd2: The refractive power of the d line of the second lens L2;
nd3: The refractive power of the d line of the third lens L3;
nd4: The refractive power of the d line of the fourth lens L4;
nd5: The refractive power of the d line of the fifth lens L5;
nd6: The refractive power of the d line of the sixth lens L6;
nd7: The refractive power of the d line of the glass plate GF;
vd: The abbe number;
v1: The abbe number of the first lens L1;
v2: The abbe number of the second lens L2;
v3: The abbe number of the third lens L3;
v4: The abbe number of the fourth lens L4;
v5: The abbe number of the fifth lens L5;
v6: The abbe number of the sixth lens L6;
v7: The abbe number of the glass plate GF;
IH: Image height;
TTL: Optical length (the distance on-axis from the object side surface of the first lens L1 to the image surface);
LB: The distance on-axis from the image side surface of the sixth lens L6 to the image surface (including the thickness of the glass plate GF);

$$y = (x^2/R)/[1 + \{1 - (k+1)(x^2/R^2)\}^{1/2}] + A4x^4 + A6x^6 + A8x^8 + A10x^{10} + A12x^{12} + A14x^{14} + A16x^{16} \quad (5)$$

Among them, R is a curvature radius on-axis, K is a conic index, A4, A6, A8, A10, A12, A14, A16 are aspheric surface indexes.

For convenience, the aspheric surface of each lens surface uses the aspheric surfaces shown in the above condition (5). However, the present invention is not limited to the aspherical polynomials form shown in the condition (5).

Embodiment 1

Figure 2:
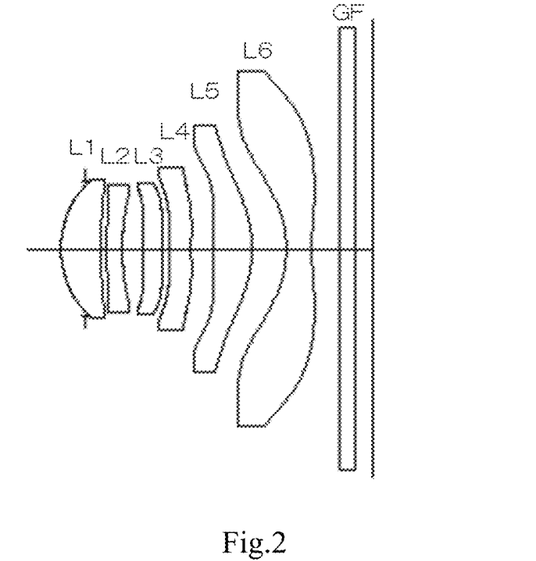
FIG. 2 is a schematic diagram of the camera lens LA in accordance with a first embodiment of the present invention.

FIG. 2 is a schematic diagram of the camera lens LA in accordance with a first embodiment of the present invention. The data of table 1 includes: the curvature radius R of the object side and the image side from the first lens L1 to the sixth lens L6, the central distance of lens and the distance d between lenses, the refractive power nd and the abbe number vd. The data of table 2 includes: conic index k, aspheric surface index.

TABLE 1

| | R | d | | nd | | v d |
|---|---|---|---|---|---|---|
| S1 | ∞ | d0= | −0.350 | | | |
| R1 | 1.38956 | d1= | 0.561 | nd1 | 1.5441 | v 1 | 56.04 |
| R2 | 5.57788 | d2= | 0.082 | | | |
| R3 | 6.77730 | d3= | 0.219 | nd2 | 1.6606 | v 2 | 20.40 |
| R4 | 2.91271 | d4= | 0.285 | | | |
| R5 | 9.78303 | d5= | 0.276 | nd3 | 1.5441 | v 3 | 56.04 |
| R6 | 15.13284 | d6= | 0.108 | | | |
| R7 | 15.99095 | d7= | 0.302 | nd4 | 1.6398 | v 4 | 23.27 |
| R8 | 6.37355 | d8= | 0.310 | | | |
| R9 | 7.10532 | d9= | 0.544 | nd5 | 1.5441 | v 5 | 56.04 |
| R10 | −1.71605 | d10= | 0.486 | | | |
| R11 | −1.77685 | d11= | 0.357 | nd6 | 1.5441 | v 6 | 56.04 |
| R12 | 3.36565 | d12= | 0.400 | | | |
| R13 | ∞ | d13= | 0.210 | nd7 | 1.5168 | v 7 | 64.17 |
| R14 | ∞ | d14= | 0.253 | | | |

TABLE 2

| | Conic Index | Aspherical Surface Index | | | | | | |
|---|---|---|---|---|---|---|---|---|
| | k | A4 | A6 | A8 | A10 | A12 | A14 | A16 |
| R1 | −6.5558E−04 | −5.4375E−04 | 8.6322E−02 | −2.7718E−01 | 5.3073E−01 | −4.7154E−01 | 1.7061E−01 | 2.3864E−03 |
| R2 | 8.2164E−02 | −1.0773E−01 | 2.3195E−01 | −5.1210E−01 | 1.3286E+00 | −2.3469E+00 | 2.3204E+00 | −1.0053E+00 |
| R3 | −4.1642E−02 | −1.8689E−01 | 2.4217E−01 | −3.1336E−02 | 2.3387E−01 | −1.5627E+00 | 2.5158E+00 | −1.3823E+00 |
| R4 | 1.2757E−02 | −1.3056E−01 | 4.0016E−01 | −9.3848E−01 | 2.2252E+00 | −3.2339E+00 | 2.2792E+00 | −4.7875E−01 |
| R5 | 6.2201E−02 | −1.2857E−01 | 1.6377E−01 | −1.0951E+00 | 2.1149E+00 | −1.7790E+00 | −5.7415E−01 | 1.2655E+00 |
| R6 | −3.8298E+00 | −3.2356E−01 | 1.0662E+00 | −3.2846E+00 | 5.3838E+00 | −5.0306E+00 | 2.0854E+00 | −6.3910E−02 |
| R7 | 2.3246E+00 | −6.0876E−01 | 1.6135E+00 | −3.5936E+00 | 5.5683E+00 | −5.5762E+00 | 3.2341E+00 | −8.1375E−01 |
| R8 | 2.6776E−03 | −5.0754E−01 | 8.1161E−01 | −1.0491E+00 | 8.3855E−01 | −2.1541E−01 | −1.0293E−01 | 5.3170E−02 |
| R9 | −4.6253E−01 | −1.6682E−01 | 3.3510E−02 | 2.1252E−02 | −5.6884E−02 | 4.5911E−02 | −1.4595E−02 | 1.6319E−03 |
| R10 | −5.0282E+00 | −2.8887E−02 | −4.9679E−02 | 7.3217E−02 | −2.8189E−02 | 2.8317E−03 | 4.6712E−04 | −8.4271E−05 |
| R11 | −7.6988E+00 | −2.3314E−01 | 1.6864E−01 | −5.7082E−02 | 1.1976E−02 | −1.6806E−03 | 1.4828E−04 | −6.2829E−06 |
| R12 | −3.1205E+01 | −1.0881E−01 | 6.8052E−02 | −3.0327E−02 | 8.5381E−03 | −1.4890E−03 | 1.4455E−04 | −5.8533E−06 |

Table 7 shows the various values of the embodiments 1, 2, 3, and the values corresponding with the parameters which are already specified in the conditions (1)~(4).

As shown in Table 7, the embodiment 1 satisfies the conditions (1)~(4).

Figure 3:
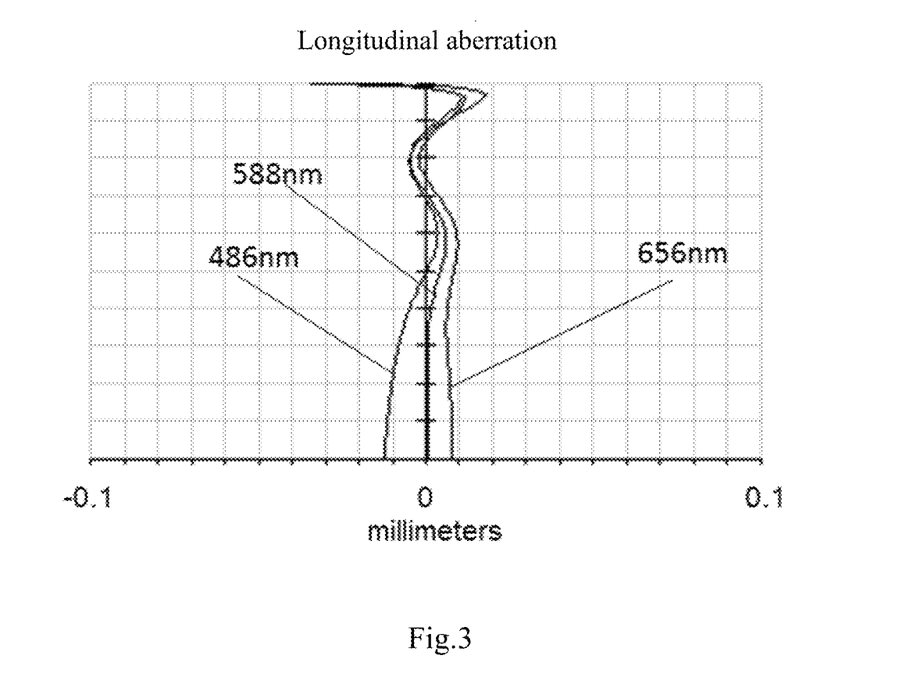
FIG. 3 shows the longitudinal aberration of the camera lens LA shown in FIG. 1.
Figure 4:
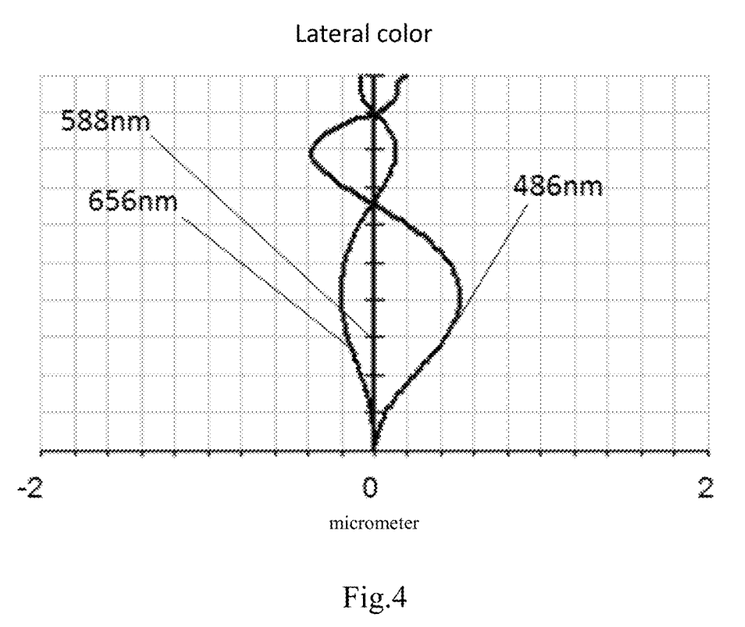
FIG. 4 shows the lateral color of the camera lens LA shown in FIG. 1.
Figure 5:
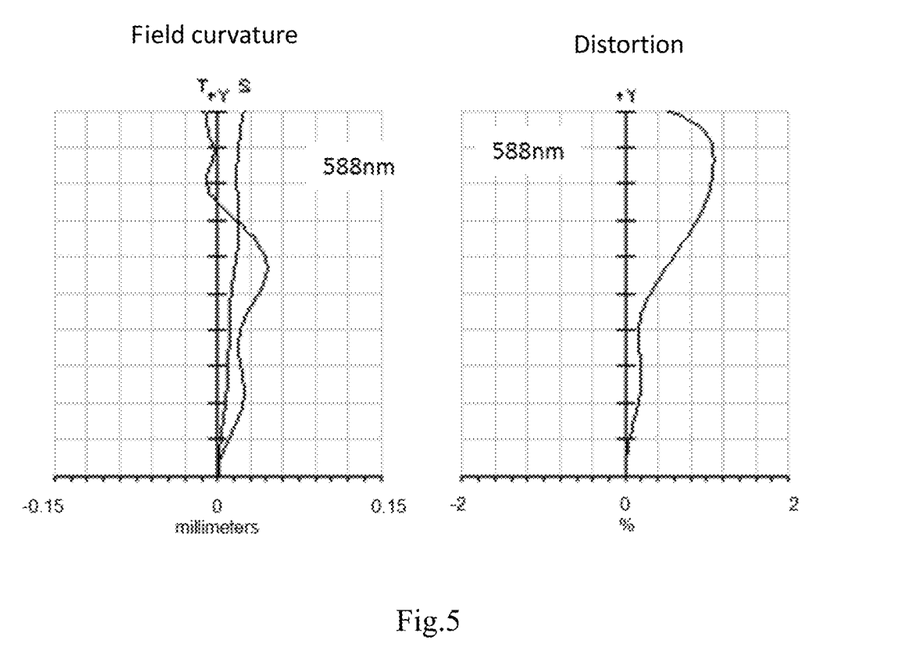
FIG. 5 presents a schematic diagram of the field curvature and distortion of the camera lens LA shown in FIG. 1.

In this embodiment, the longitudinal aberration of the camera lens LA is shown in FIG. 3, the lateral color of the camera lens LA is shown in FIG. 4, and the field curvature and distortion of the camera lens LA is shown in FIG. 5. In addition, the field curvature S in FIG. 5 is a field curvature corresponding to sagittal image surface, T is a field curvature corresponding to tangent image surface. This is the same as in embodiment 2 and embodiment 3. As shown in FIG. 3 to FIG. 5, the camera lens LA of embodiment 1 is TTL/IH=1.390, Fno=2.00, hence the camera lens LA has an excellent optical characteristics with ultra-thin and high light flux (Fno).

Embodiment 2

Figure 6:
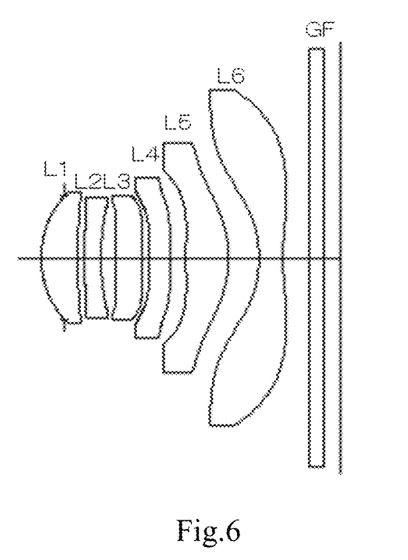
FIG. 6 is a schematic diagram of a camera lens LA in accordance with a second embodiment of the present invention.

FIG. 6 is a schematic diagram of a camera lens LA in accordance with a second embodiment of the present invention. The data of table 3 includes: the curvature radius R of the object side and the image side from the first lens L1 to the sixth lens L6, the central distance of lens and the distance d between lenses, the refractive power nd and the abbe number vd. The data of table 2 includes: conic index k, aspheric surface index.

Table 3 and table 4 show the design data of the camera lens LA in embodiment 2 of the present invention.

TABLE 3

| | R | d | | nd | | v d |
|---|---|---|---|---|---|---|
| S1 | ∞ | d0= | −0.350 | | | |
| R1 | 1.42600 | d1= | 0.540 | nd1 | 1.5441 | v 1 | 56.04 |
| R2 | 6.69666 | d2= | 0.104 | | | |
| R3 | 7.26262 | d3= | 0.240 | nd2 | 1.6606 | v 2 | 20.40 |
| R4 | 2.88337 | d4= | 0.223 | | | |
| R5 | 8.28941 | d5= | 0.399 | nd3 | 1.5441 | v 3 | 56.04 |
| R6 | 13.39059 | d6= | 0.100 | | | |
| R7 | 14.02012 | d7= | 0.300 | nd4 | 1.6398 | v 4 | 23.27 |
| R8 | 5.64043 | d8= | 0.237 | | | |
| R9 | 7.89326 | d9= | 0.639 | nd5 | 1.5441 | v 5 | 56.04 |
| R10 | −1.50359 | d10= | 0.450 | | | |
| R11 | −1.79659 | d11= | 0.349 | nd6 | 1.5441 | v 6 | 56.04 |
| R12 | 2.80996 | d12= | 0.400 | | | |

TABLE 3-continued

| | R | d | | nd | | v d |
|---|---|---|---|---|---|---|
| R13 | ∞ | d13= | 0.210 | nd7 | 1.5168 | v 7 | 64.17 |
| R14 | ∞ | d14= | 0.236 | | | |

TABLE 4

| | Conic Index | Aspherical Surface Index | | | | | | |
|---|---|---|---|---|---|---|---|---|
| | k | A4 | A6 | A8 | A10 | A12 | A14 | A16 |
| R1 | −3.0010E−02 | −4.9062E−03 | 9.7838E−02 | −3.0189E−01 | 5.1783E−01 | −4.4915E−01 | 2.0283E−01 | −3.9863E−02 |
| R2 | 7.4761E+00 | −1.0102E−01 | 2.0986E−01 | −4.9641E−01 | 1.3373E+00 | −2.3841E+00 | 2.2795E+00 | −8.9454E−01 |
| R3 | 6.5983E−01 | −1.8719E−01 | 2.5401E−01 | −2.9911E−02 | 2.4603E−01 | −1.5992E+00 | 2.4205E+00 | −1.1719E+00 |
| R4 | −2.6424E+00 | −1.4499E−01 | 4.5547E−01 | −9.6951E−01 | 2.0941E+00 | −3.2131E+90 | 2.5924E+00 | −6.9704E−01 |
| R5 | 1.3828E+01 | −1.1925E−01 | 1.2842E−01 | −9.8380E−01 | 2.2771E+00 | −2.0620E+00 | −1.2937E+00 | 2.0740E+00 |
| R6 | −1.2276E+03 | −3.5496E−01 | 1.0945E+00 | −3.2933E+00 | 5.2979E+00 | −4.9930E+00 | 2.2023E+00 | −1.9272E−01 |
| R7 | −1.9447E+03 | −6.4360E−01 | 1.5628E+00 | −3.6124E+00 | 5.6009E+00 | −5.5392E+00 | 3.2378E+00 | −8.3023E−01 |
| R8 | −2.6444E+01 | −5.2754E−01 | 7.9042E−01 | −1.0451E+00 | 8.4465E−01 | −2.0723E−01 | −9.7377E−02 | 4.5187E−02 |
| R9 | −6.4685E+01 | −1.7230E−01 | 2.9639E−02 | 1.3099E−02 | −5.9074E−02 | 4.9503E−02 | −1.4472E−02 | 4.9010E−04 |
| R10 | −4.0414E+00 | −1.8994E−02 | −5.1140E−02 | 7.2708E−02 | −2.8073E−02 | 2.9036E−03 | 4.7146E−04 | −9.4502E−05 |
| R11 | −8.4749E+00 | −2.3870E−01 | 1.6965E−01 | −5.7001E−02 | 1.1966E−02 | −1.6854E−03 | 1.4857E−04 | −6.1267E−06 |
| R12 | −2.2391E+01 | −1.0889E−01 | 6.8181E−02 | −3.0296E−02 | 8.5275E−03 | −1.4891E−03 | 1.4461E−04 | −5.9102E−06 |

As shown in Table 7, the embodiment 2 satisfies the conditions (1)~(4).

Figure 7:
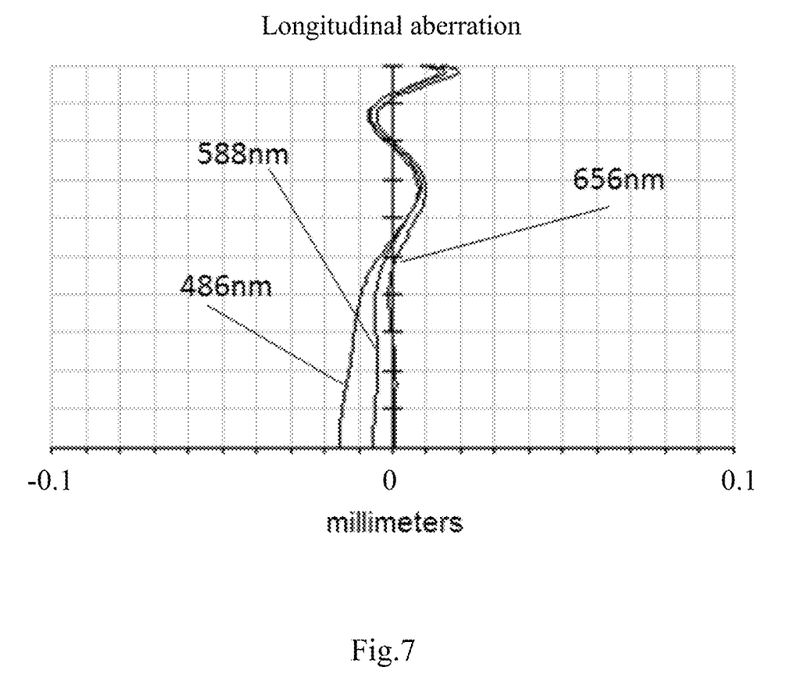
FIG. 7 presents the longitudinal aberration of the camera lens LA shown in FIG. 6.
Figure 8:
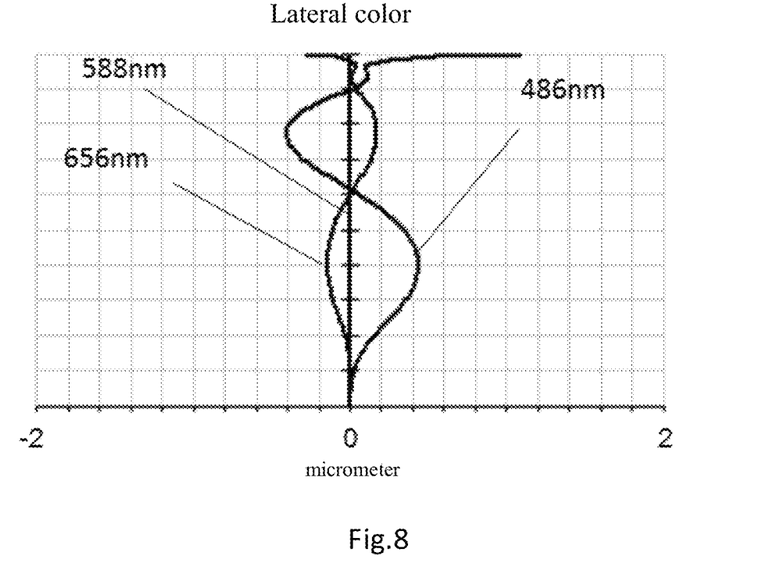
FIG. 8 presents the lateral color of the camera lens LA shown in FIG. 6.
Figure 9:
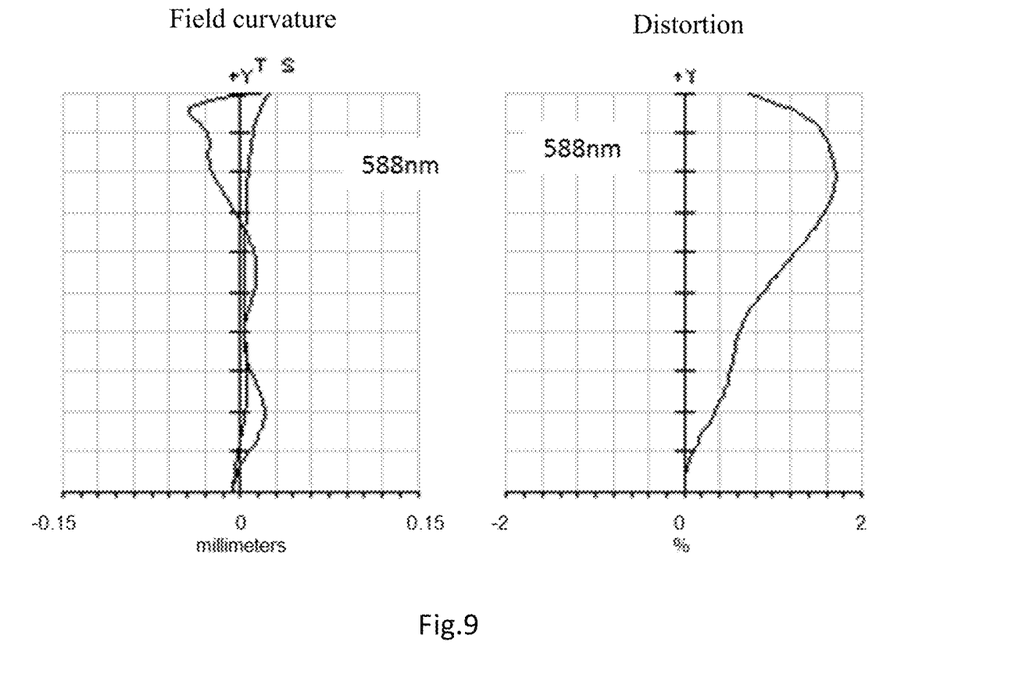
FIG. 9 presents the field curvature and distortion of the camera lens LA shown in FIG. 6.

In this embodiment, the longitudinal aberration of the camera lens LA is shown in FIG. 7, the lateral color of the camera lens LA is shown in FIG. 8, and the field curvature and distortion of the camera lens LA is shown in FIG. 9. As shown in FIG. 7 to FIG. 9, the camera lens LA of embodiment 2 is TTL/IH=1.401, Fno=2.00, hence the camera lens LA has an excellent optical characteristics with ultra-thin and high light flux (Fno).

Embodiment 3

Figure 10:
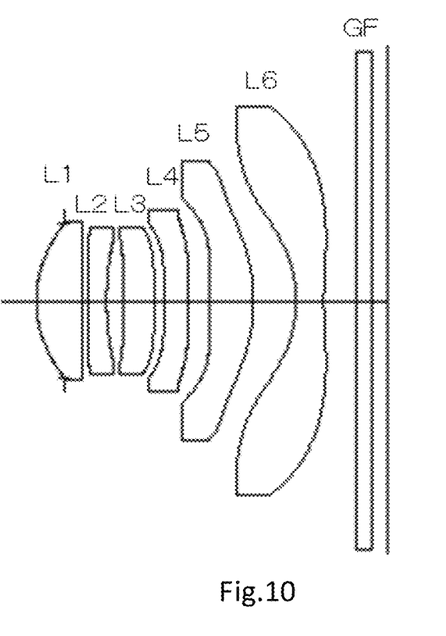
FIG. 10 is a schematic diagram of a camera lens LA in accordance with a third embodiment of the present invention.

FIG. 10 is a schematic diagram of a camera lens LA in accordance with a third embodiment of the present invention. The data of table 5 includes: the curvature radius R of the object side and the image side from the first lens L1 to the sixth lens L6, the central distance of lens and the distance d between lenses, the refractive power nd and the abbe number vd. The data of table 2 includes: conic index k, aspheric surface index.

Table 5 and table 6 show the design data of the camera lens LA in embodiment 3 of the present invention.

TABLE 5

| | R | d | | nd | | v d | |
|---|---|---|---|---|---|---|---|
| S1 | ∞ | d0= | −0.350 | | | | |
| R1 | 1.43095 | d1= | 0.571 | nd1 | 1.5441 | v 1 | 56.04 |
| R2 | 8.47348 | d2= | 0.069 | | | | |
| R3 | 9.26762 | d3= | 0.237 | nd2 | 1.6606 | v 2 | 20.40 |

TABLE 5-continued

| | R | d | | nd | | v d | |
|---|---|---|---|---|---|---|---|
| R4 | 3.10630 | d4= | 0.199 | | | | |
| R5 | 10.79963 | d5= | 0.395 | nd3 | 1.5441 | v 3 | 56.04 |
| R6 | 16.55943 | d6= | 0.123 | | | | |
| R7 | 7.54832 | d7= | 0.297 | nd4 | 1.6398 | v 4 | 23.27 |
| R8 | 4.88656 | d8= | 0.269 | | | | |
| R9 | 7.01352 | d9= | 0.556 | nd5 | 1.5441 | v 5 | 56.04 |
| R10 | −2.21482 | d10= | 0.531 | | | | |
| R11 | −1.81570 | d11= | 0.349 | nd6 | 1.5441 | v 6 | 56.04 |
| R12 | 4.04127 | d12= | 0.400 | | | | |
| R13 | ∞ | d13= | 0.210 | nd7 | 1.5168 | v 7 | 64.17 |
| R14 | ∞ | d14= | 0.187 | | | | |

TABLE 6

| | Conic Index | Aspherical Surface Index | | | | | | |
|---|---|---|---|---|---|---|---|---|
| | k | A4 | A6 | A8 | A10 | A12 | A14 | A16 |
| R1 | −1.2387E−01 | −1.7564E−02 | 1.0869E−01 | −3.2413E−01 | 5.0000E−01 | −4.4666E−01 | 2.0145E−01 | −5.1835E−02 |
| R2 | −6.7679E+01 | −1.2837E−01 | 2.2016E−01 | −4.7366E−01 | 1.3087E+00 | −2.4376E+00 | 2.2520E+00 | −8.1169E−01 |
| R3 | −3.9228E+01 | −1.9407E−01 | 2.8836E−01 | −7.1262E−03 | 2.4867E−01 | −1.6329E+00 | 2.3914E+00 | −1.0941E+00 |
| R4 | −3.6858E+00 | −1.4707E−01 | 4.8424E−01 | −9.7710E−01 | 2.0794E+00 | −3.2386E+00 | 2.5664E+00 | −3.9960E−01 |
| R5 | −1.4209E+01 | −1.2398E−01 | 1.0416E−01 | −9.9619E−01 | 2.3786E+00 | −1.9283E+00 | −1.3858E+00 | 2.3508E+00 |
| R6 | −1.0621E+03 | −3.6571E−01 | 1.0954E+00 | −3.3211E+00 | 5.3354E+00 | −4.8708E+00 | 2.3764E+00 | −4.5400E−01 |
| R7 | −1.1758E+02 | −6.1002E−01 | 1.5318E+00 | −3.6691E+00 | 5.6160E+00 | −5.4344E+00 | 3.2891E+00 | −9.9413E−01 |
| R8 | 8.2978E−01 | −5.1907E−01 | 7.7822E−01 | −1.0440E+00 | 8.4423E−01 | −2.1249E−01 | −1.0051E−01 | 4.9708E−02 |
| R9 | −6.0803E+01 | −1.8677E−01 | 2.0047E−02 | 1.8694E−02 | −5.4403E−02 | 4.6253E−02 | −1.5829E−02 | 2.1600E−03 |
| R10 | −5.9224E+00 | −3.4395E−02 | −5.2087E−02 | 7.3349E−02 | −2.7852E−02 | 2.9030E−03 | 4.5504E−04 | −9.9737E−05 |
| R11 | −5.0561E+00 | −2.2966E−01 | 1.6954E−01 | −5.7179E−02 | 1.1936E−02 | −1.6863E−03 | 1.4950E−04 | −6.0575E−06 |
| R12 | −5.4583E+01 | −1.0465E−01 | 6.7731E−02 | −3.0346E−02 | 8.5489E−03 | −1.4884E−03 | 1.4432E−04 | −5.9011E−06 |

As shown in Table 7, the embodiment 3 satisfies the conditions (1)~(4).

Figure 11:
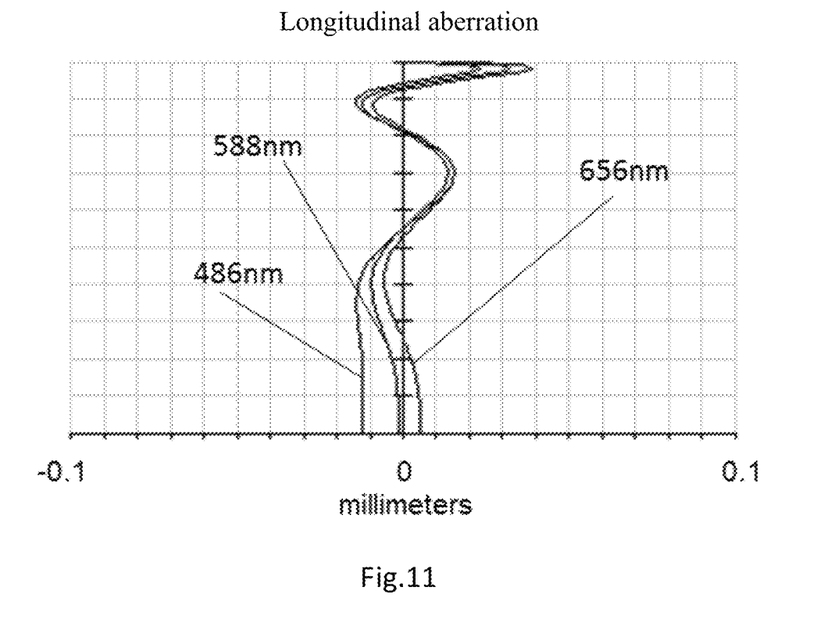
FIG. 11 presents the longitudinal aberration of the camera lens LA shown in FIG. 10.
Figure 12:
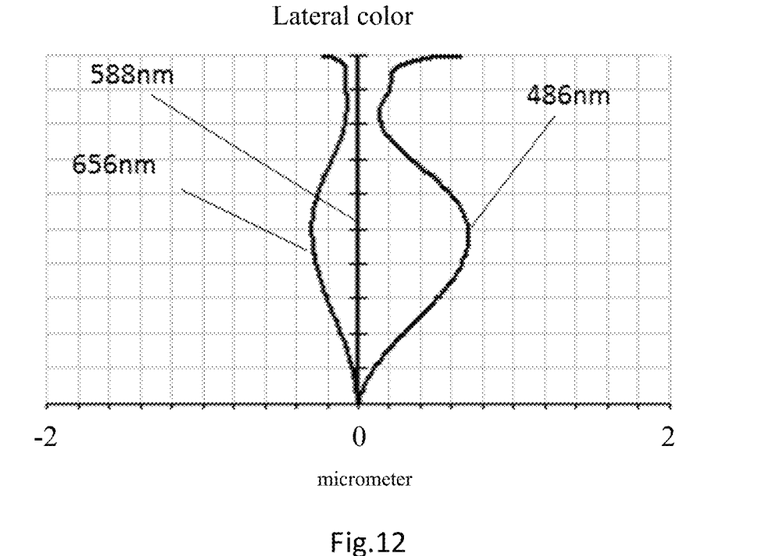
FIG. 12 presents the lateral color of the camera lens LA shown in FIG. 10.
Figure 13:
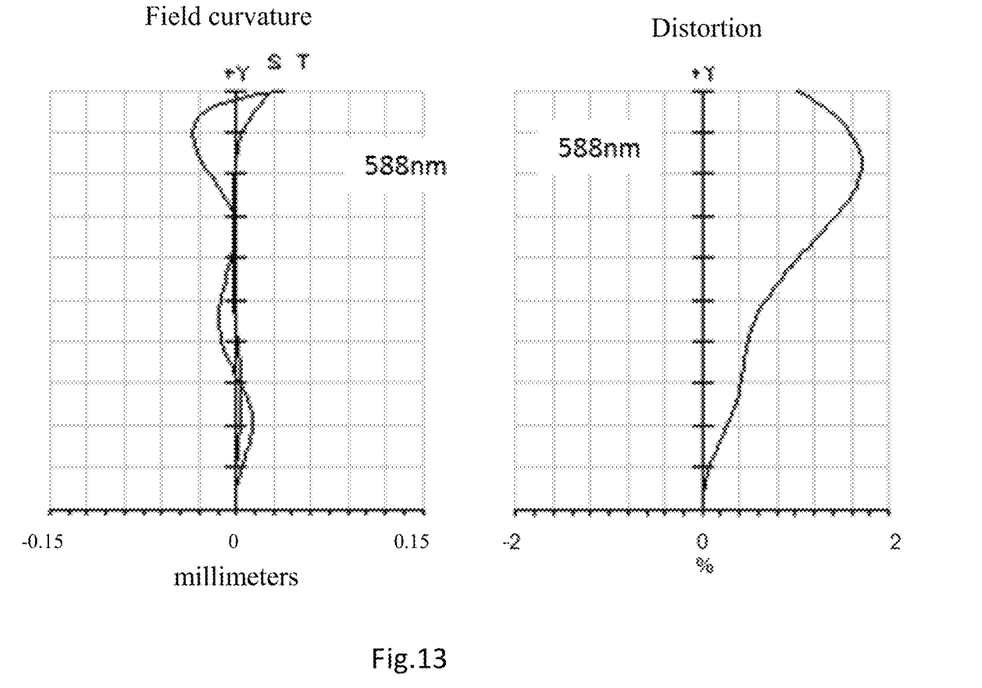
FIG. 13 presents the field curvature and distortion of the camera lens LA shown in FIG. 10.

In this embodiment, the longitudinal aberration of the camera lens LA is shown in FIG. 11, the lateral color of the camera lens LA is shown in FIG. 12, and the field curvature and distortion of the camera lens LA is shown in FIG. 13. As shown in FIG. 11 to FIG. 13, the camera lens LA of embodiment 3 is TTL/IH=1.390, Fno=2.00, hence the camera lens LA has an excellent optical characteristics with ultra-thin and high light flux (Fno).

Table 7 shows the various values of the embodiments 1, 2, 3, and the values corresponding with the parameters which are already specified in the conditions (1)~(4). In addition, the units of the various values shown in table 5 respectively are 2 ω(°), f (mm), f1 (mm), f2 (mm), f3 (mm), f4 (mm), f5 (mm), f6 (mm) TTL (mm), LB (mm), IH (mm).

TABLE 7

| | Embodiment 1 | Embodiment 2 | Embodiment 3 | Notes |
|---|---|---|---|---|
| f3/f | 13.129 | 10.500 | 14.500 | Condition (1) |
| (R5 + R6)/(R5 − R6) | −4.657 | −4.250 | −4.750 | Condition (2) |
| (R9 + R10)/(R9 − R10) | 0.611 | 0.680 | 0.520 | Condition (3) |
| d10/f | 0.128 | 0.121 | 0.138 | Condition (4) |
| TTL/IH | 1.390 | 1.401 | 1.390 | |
| Fno | 2.00 | 2.00 | 2.00 | |
| 2ω | 79.4 | 80.9 | 78.9 | |
| f | 3.805 | 3.707 | 3.843 | |
| f1 | 3.248 | 3.214 | 3.077 | |
| f2 | −7.912 | −7.401 | −7.184 | |
| f3 | 49.956 | 38.922 | 55.723 | |
| f4 | −16.770 | −14.960 | −22.647 | |
| f5 | 2.597 | 2.378 | 3.161 | |
| f6 | −2.086 | −1.962 | −2.255 | |
| TTL | 4.393 | 4.427 | 4.393 | |
| LB | 0.863 | 0.846 | 0.797 | |
| IH | 3.160 | 3.160 | 3.160 | |

In which, the meaning of the various symbols is as follows.

LA: The camera lens;
S1: Aperture;
L1: The first lens;
L2: The second lens;
L3: The third lens;
L4: The fourth lens;
L5: The fifth lens;
L6: The sixth lens;
GL: The glass plate;
R1: The curvature radius of the object side surface of the first lens L1;
R2: The curvature radius of the image side surface of the first lens L1;
R3: The curvature radius of the object side surface of the second lens L2;
R4: The curvature radius of the image side surface of the second lens L2;
R5: The curvature radius of the object side surface of the third lens L3;
R6: The curvature radius of the image side surface of the third lens L3;
R7: The curvature radius of the object side surface of the fourth lens L4;
R8: The curvature radius of the image side surface of the fourth lens L4;
R9: The curvature radius of the object side surface of the fifth lens L5;
R10: The curvature radius of the image side surface of the fifth lens L5;
R11: The curvature radius of the object side surface of the sixth lens L6;
R12: The curvature radius of the image side surface of the sixth lens L6;
R13: The curvature radius of the object side surface of the glass plate GF;
R14: The curvature radius of the image side surface of the glass plate GF;
d: The thickness on-axis of the lens and the distance on-axis between the lens;
d0: The distance on-axis from aperture S1 to the object side surface of the first lens L1;
d1: The thickness on-axis of the first lens L1;
d2: The distance on-axis from the image side surface of the first lens L1 to the object side surface of the second lens L2;
d3: The thickness on-axis of the second lens L2;
d4: The distance on-axis from the image side surface of the second lens L2 to the object side surface of the third lens L3;
d5: The thickness on-axis of the third lens L3;
d6: The distance on-axis from the image side surface of the third lens L3 to the object side surface of the fourth lens L4;
d7: The thickness on-axis of the fourth lens L4;
d8: The distance on-axis from the image side surface of the fourth lens L4 to the object side surface of the fifth lens L5;
d9: The thickness on-axis of the fifth lens L5;
d10: The distance on-axis from the image side surface of the fifth lens L5 to the object side surface of the sixth lens L6;
d11: The thickness on-axis of the sixth lens L6;
d12: The distance on-axis from the image side surface of the sixth lens L6 to the object side surface of the optical filter GF;
d13: The thickness on-axis of the optical filter GF;
d14: The distance on-axis from the image side surface to the image surface of the optical filter GF.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, from an object side to an image side in sequence: a first lens having a positive refractive power, a second lens having a negative refractive power, a third lens having a positive refractive power, a fourth lens having a negative refractive power, a fifth lens having a positive refractive power, and a sixth lens having a negative refractive power; wherein the camera lens further satisfies the following conditions (1)~(3):

$$10.00 \leq f3/f \leq 15.00 \quad (1)$$

$$-4.80 \leq (R5+R6)/(R5-R6) \leq -4.20 \quad (2)$$

$$0.50 \leq (R9+R10)/(R9-R10) \leq 0.70 \quad (3)$$

where f: the focal length of the camera lens;
f3: the focal length of the third lens;
R5: the curvature radius of the object side surface of the third lens;
R6: the curvature radius of the image side surface of the third lens;
R9: the curvature radius of the object side surface of the fifth lens;
R10: the curvature radius of the image side surface of the fifth lens.

2. The camera lens as described in claim 1 further satisfying the following condition (4):

$$0.12 \leq d10/f \leq 0.14 \quad (4)$$

where f: the focal length of the camera lens;

d10: The distance on-axis from the image side surface of the fifth lens to the object side surface of the sixth lens.

* * * * *

UNITED STATES PATENT AND TRADEMARK OFFICE
CERTIFICATE OF CORRECTION

PATENT NO. : 10,558,018 B2
APPLICATION NO. : 16/006865
DATED : February 11, 2020
INVENTOR(S) : Hiroyuki Teraoka Page 1 of 1

It is certified that error appears in the above-identified patent and that said Letters Patent is hereby corrected as shown below:

On the Title Page

Item (73) Line 1 to Line 2, the sole assignee's name and location reading:
-AAC Technologies Pte. Ltd., Singapore (SG)-

Should be changed to:
-AAC Acoustic Technologies (Shenzhen) Co., Ltd., Shenzhen (CN)-.

Signed and Sealed this
Twentieth Day of October, 2020

Andrei Iancu
*Director of the United States Patent and Trademark Office*